US012160269B2

(12) United States Patent
Luo et al.

(10) Patent No.: US 12,160,269 B2
(45) Date of Patent: Dec. 3, 2024

(54) BI-DIRECTIONAL AND MULTI-CHANNEL OPTICAL MODULE WITH SINGLE TRANSMITTER AND MULTIPLE RECEIVERS IN SINGLE CASING

(71) Applicant: Global Technology Inc., Zhejiang (CN)

(72) Inventors: Jian-Hong Luo, Ningbo (CN); Dong-Biao Jiang, Ningbo (CN); Fu Chen, Ningbo (CN); Hao Zhou, Ningbo (CN)

(73) Assignee: Global Technology Inc., Ningbo (CN)

( * ) Notice: Subject to any disclaimer, the term of this patent is extended or adjusted under 35 U.S.C. 154(b) by 61 days.

(21) Appl. No.: 17/984,690

(22) Filed: Nov. 10, 2022

(65) Prior Publication Data

US 2024/0039634 A1 Feb. 1, 2024

(30) Foreign Application Priority Data

Jul. 29, 2022 (CN) .......................... 202210904596.2

(51) Int. Cl.
*H04B 10/25* (2013.01)
*H04B 10/50* (2013.01)
*H04B 10/67* (2013.01)

(52) U.S. Cl.
CPC ....... *H04B 10/2589* (2020.05); *H04B 10/506* (2013.01); *H04B 10/671* (2013.01)

(58) Field of Classification Search
CPC . H04B 10/2589; H04B 10/506; H04B 10/671
USPC ........................................................ 398/140
See application file for complete search history.

(56) References Cited

U.S. PATENT DOCUMENTS

| 8,145,059 B2 * | 3/2012 | Yu ........................... H04B 10/40 398/208 |
| 11,418,259 B2 * | 8/2022 | Way ................. H04B 10/25073 |
| 2006/0045531 A1 * | 3/2006 | Killmeyer ............... H03F 3/087 398/135 |
| 2007/0058976 A1 * | 3/2007 | Tatum .................. G02B 6/4246 398/99 |

(Continued)

FOREIGN PATENT DOCUMENTS

| CN | 111323877 A | * | 6/2020 | ............. G02B 6/421 |
| JP | 2015215402 A | * | 12/2015 | ............... G02B 6/42 |

(Continued)

*Primary Examiner* — Abbas H Alagheband
(74) *Attorney, Agent, or Firm* — Grossman Tucker Perreault & Pfleger, PLLC (57) ABSTRACT

A bi-directional and multi-channel optical module incudes an encapsulation casing, a TOSA, a plurality of ROSAs and a plurality of optical folding elements. The TOSA is accommodated in the encapsulation casing. The TOSA includes a light emitting element and a thin film LiNbOx modulator, and a light receiving end of the thin film LiNbOx modulator is optically coupled with the light emitting element. The ROSAs are accommodated in the encapsulation casing. The ROSAs are configured to receive external optical signals propagating into the encapsulation casing. The optical folding elements are optically coupled with a plurality of light propagation ends of the thin film LiNbOx modulator, respectively, for changing a traveling direction of light emitted by the TOSA. Each of the optical folding elements is configured to enable one of the ROSAs share a fiber access terminal with the TOSA.

20 Claims, 6 Drawing Sheets

(56) References Cited

U.S. PATENT DOCUMENTS

| | | | | |
|---|---|---|---|---|
| 2008/0292322 A1* | 11/2008 | Daghighian | ............ | H04J 14/02 |
| | | | | 398/192 |
| 2015/0256259 A1* | 9/2015 | Huang | .................. | H04B 10/40 |
| | | | | 398/139 |
| 2017/0307819 A1* | 10/2017 | Ho | ...................... | H04J 14/0256 |
| 2018/0180829 A1* | 6/2018 | Gudeman | ........... | H01S 5/18361 |
| 2021/0058158 A1* | 2/2021 | Earnshaw | ............... | H04J 14/02 |
| 2022/0014272 A1* | 1/2022 | Shin | ....................... | H04B 10/40 |

FOREIGN PATENT DOCUMENTS

| | | | | | |
|---|---|---|---|---|---|
| TW | | 201537249 A | * | 10/2015 | ............ G02B 6/4204 |
| WO | WO-2012097554 A1 | * | 7/2012 | ......... H04B 10/2503 |
| WO | WO-2023065010 A1 | * | 4/2023 | ....... H04B 10/25133 |

* cited by examiner

BI-DIRECTIONAL AND MULTI-CHANNEL OPTICAL MODULE WITH SINGLE TRANSMITTER AND MULTIPLE RECEIVERS IN SINGLE CASING

CROSS-REFERENCE TO RELATED APPLICATIONS

This application claims priority under 35 U.S.C. § 119(a) on Patent Application No(s). 202210904596.2 filed in China on Jul. 29, 2022, the entire contents of which are hereby incorporated by reference.

BACKGROUND

1. Technical Field

The present disclosure relates to optical communication, more particularly to a bi-directional and multi-channel optical module.

2. Related Art

Optical modules are generally installed in communication facilities in modern high-speed communication networks. With the improvement of optical communication system and the increase in demand of broad bandwidth by various network services, insufficient internal space and high energy consumption of the conventional optical modules should be overcome. Any solution to provide optical modules with small size, large amount of internal space for accommodation, and low energy consumption while enhancing bandwidth and transmission speed has been one of the important topics in this technical field.

SUMMARY

According to one aspect of the present disclosure, a bi-directional and multi-channel optical module incudes an encapsulation casing, a transmitter optical subassembly (TOSA), a plurality of receiver optical subassemblies (ROSAs) and a plurality of optical folding elements. The TOSA is accommodated in the encapsulation casing. The TOSA includes a light emitting element and a thin film lithium niobate (LiNbOx) modulator, and a light receiving end of the thin film LiNbOx modulator is optically coupled with the light emitting element. The ROSAs are accommodated in the encapsulation casing. The ROSAs are configured to receive external optical signals propagating into the encapsulation casing. The optical folding elements are optically coupled with a plurality of light propagation ends of the thin film LiNbOx modulator, respectively, for changing a traveling direction of light emitted by the TOSA. Each of the optical folding elements is configured to allow for one of the ROSAs to share a fiber access terminal with the TOSA.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

Figure 1:
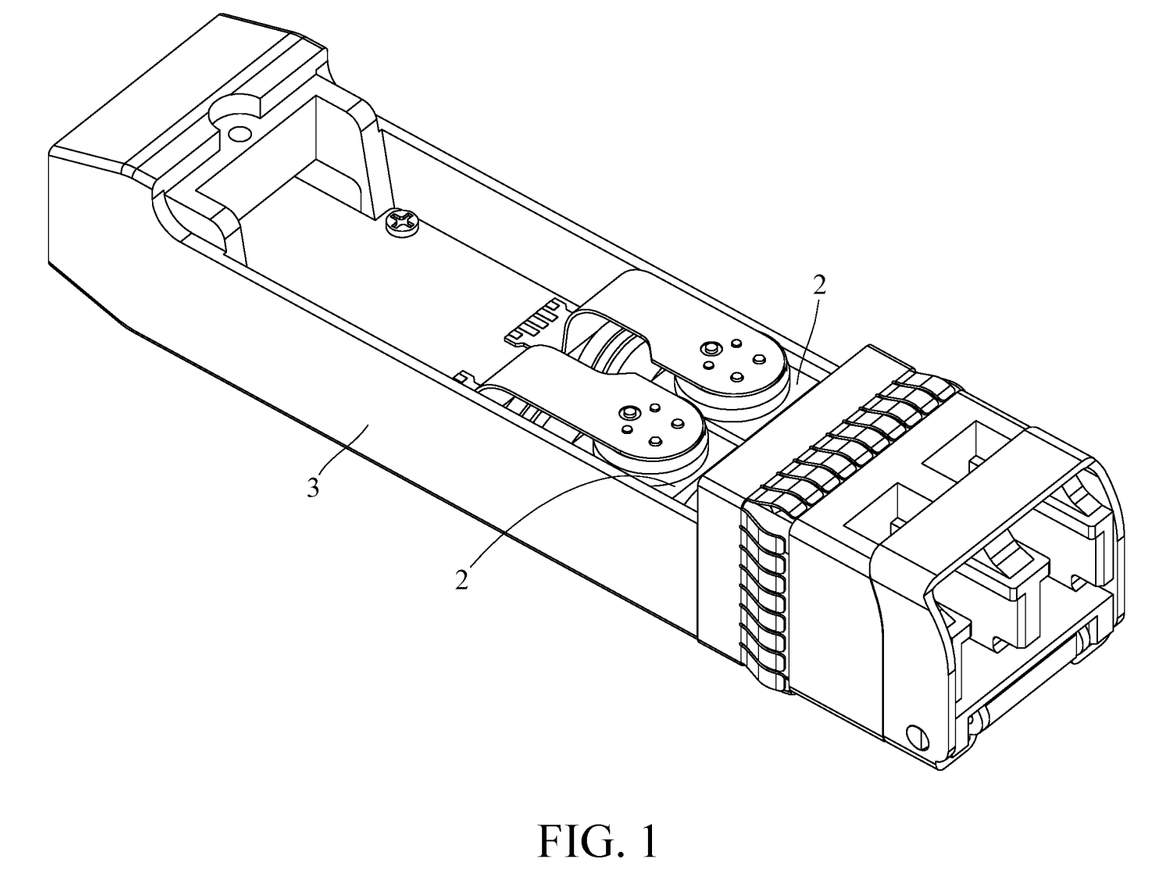
FIG. 1 is a perspective view of a single channel optical module in a conventional optical transceiver.

With the demand of various applications, the optical signal transmission is required to be at high speed and over long distance. To ensure the stability of the optical signal transmission, the optical signals emitted by the optical module is usually required to have wide bandwidth, for which the corresponding signal modulation is required to be more convenient and efficient. At the present application of Radio over Fiber (RoF), a dual-channel optical transceiver is generally realized by the combination of two separated single-channel optical modules. As shown in FIG. 1, the separated single-channel optical modules 2 are accommodated in a housing 3 of a conventional optical transceiver. However, the assembly of separated single-channel optical modules 2 occupies a lot amount of space inside an optical communication device, making it difficult to meet the requirements of compactness and small size.

Also, with the gradual development of 5G networks, electro-absorption modulated laser (EML) is used as a mainstream laser generator in an optical module to replace direct modulated laser (DML). EML enjoys the advantage of consistent laser characteristics for long distance transmission applications (usually over 10 km). However, as to an optical module including EML, the optical module is required to be designed into hermetically sealed structure due to MSA (Multi-Source Agreement), and is also required to have higher power and more complex circuit layout. These requirements lead to high cost for setting up base stations and thus hinder the popularization of 5G networks. Therefore, providing an optical module that features low cost and meets the requirements for long distance and high speed transmission is one of the urgent problems to be solved in this technical field.

Figure 2:
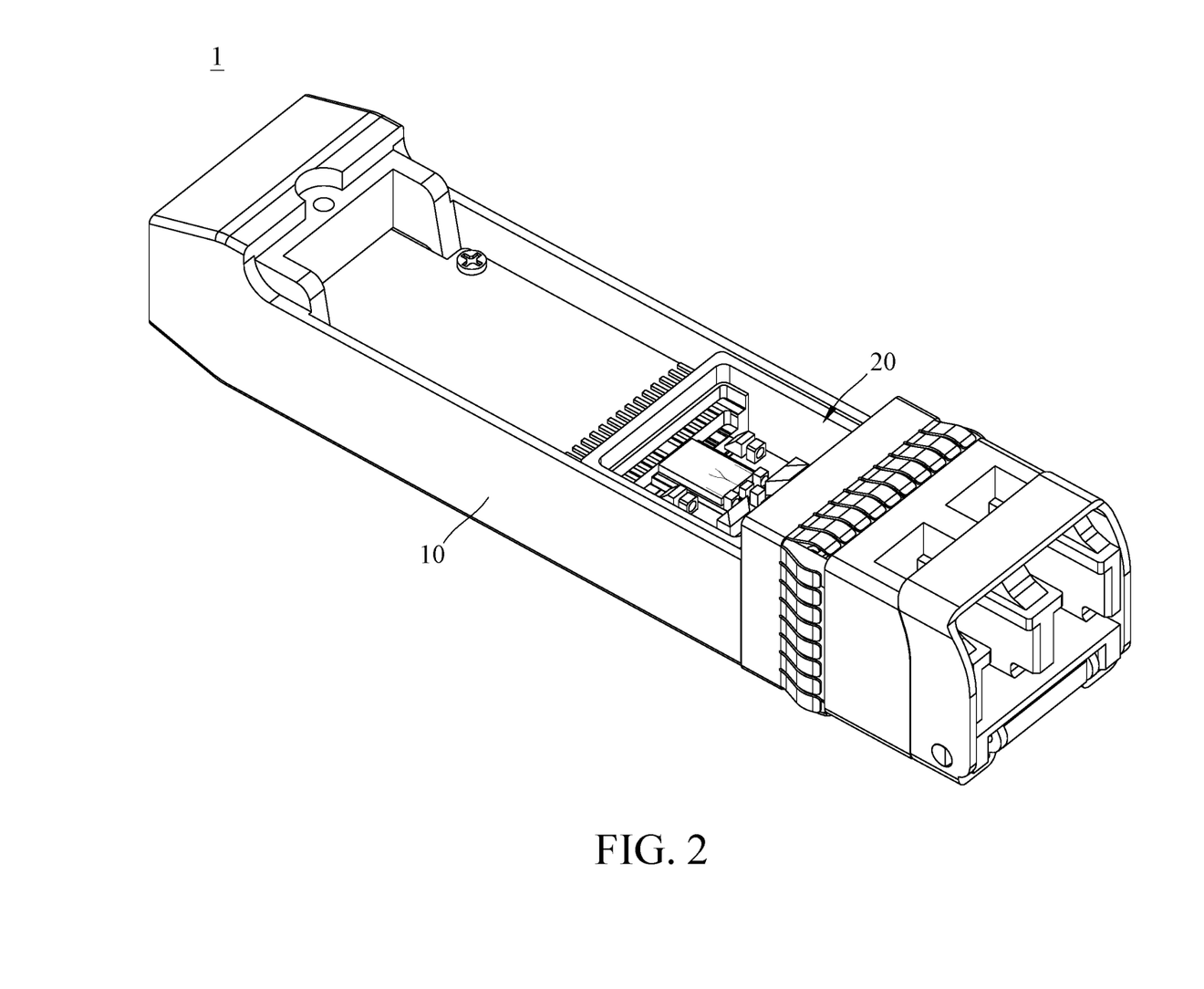
FIG. 2 is a perspective view of an optical transceiver according to one embodiment of the present disclosure.
Figure 3:
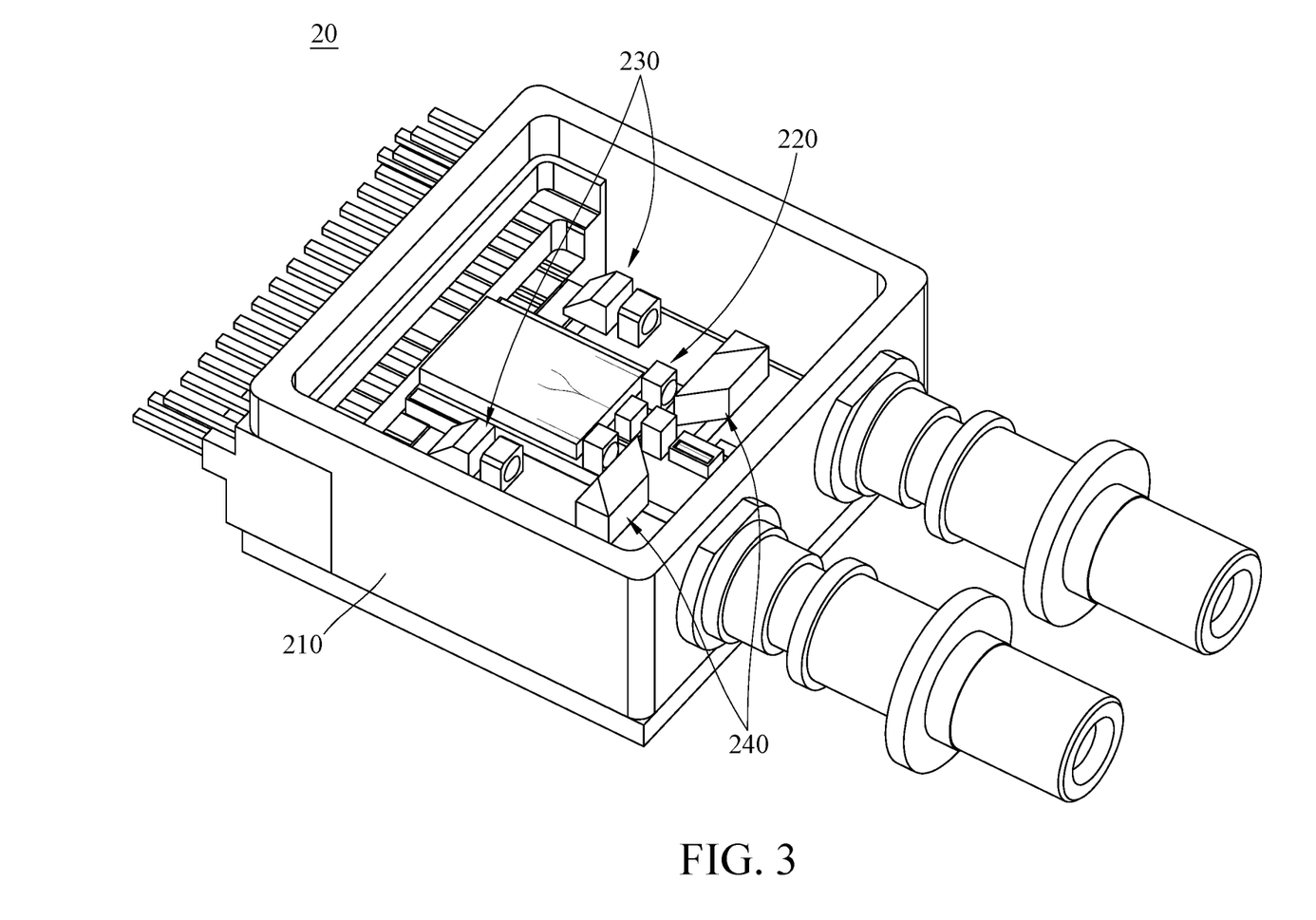
FIG. 3 is a perspective view of a bi-directional and multi-channel optical module in FIG. 2.
Figure 4:
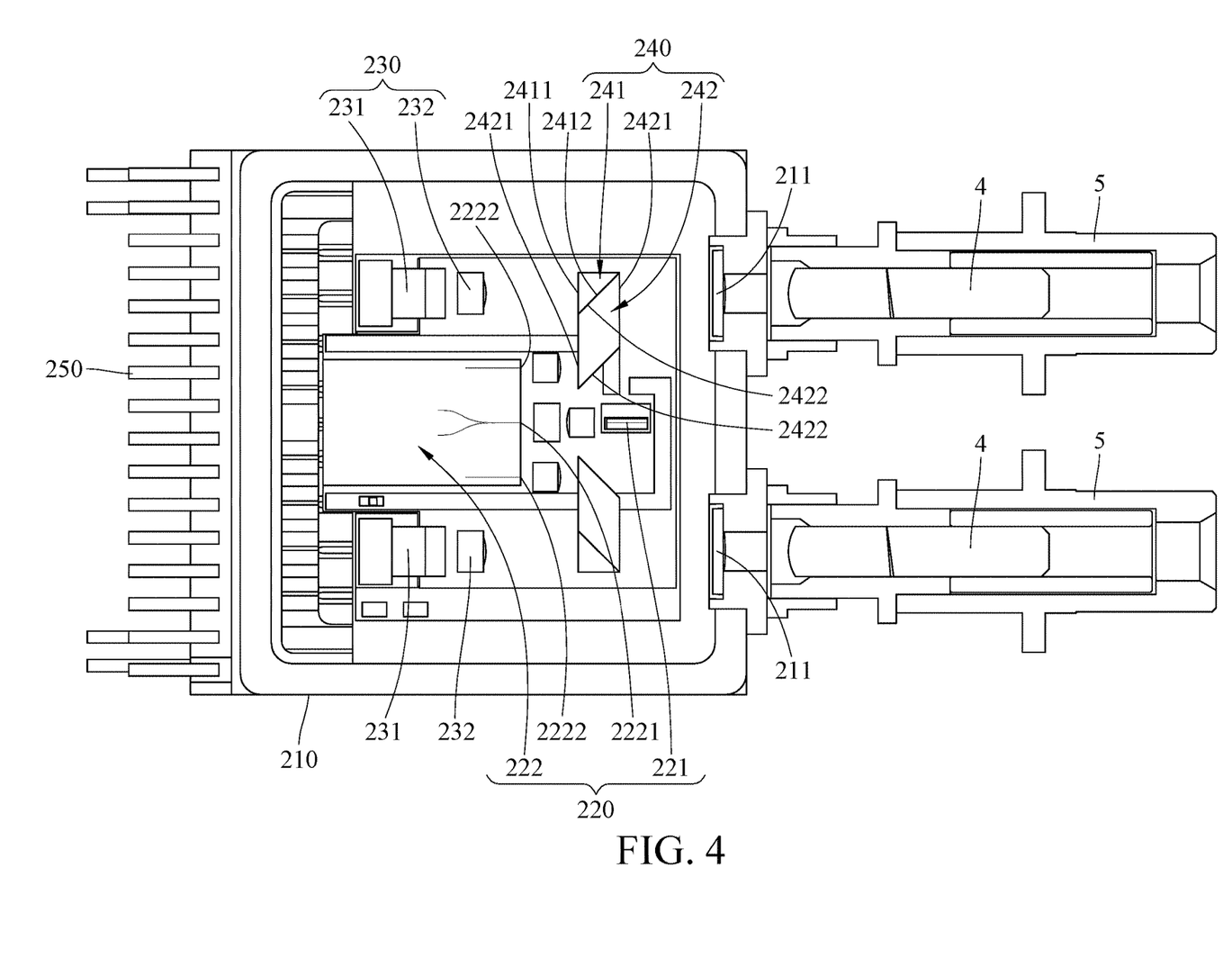
FIG. 4 is a top view of the bi-directional and multi-channel optical module in FIG. 3.

Please refer to FIG. 2 through FIG. 4. FIG. 2 is a perspective view of an optical transceiver according to one embodiment of the present disclosure, FIG. 3 is a perspective view of a bi-directional and multi-channel optical module in FIG. 2, and FIG. 4 is a top view of the bi-directional and multi-channel optical module in FIG. 3. In this embodiment, an optical transceiver 1 may include a housing 10 and a bi-directional and multi-channel optical module 20 accommodated in the housing 10. The bi-directional and multi-channel optical module 20 may include an encapsulation casing 210, a transmitter optical subassembly (TOSA) 220, a plurality of receiver optical subassemblies (ROSAs) 230 and a plurality of optical folding elements

240. FIG. 2 and FIG. 3 exemplarily show the bi-directional and multi-channel optical module 20 including two receiver optical subassemblies 230 and two optical folding elements 240. For the purpose of illustration, a top portion of the encapsulation casing 210 is omitted in FIG. 2 and FIG. 3.

The encapsulation casing 210 may be airtight or non-airtight. In this embodiment, the encapsulation casing 210 may be an airtight and one-piece formed casing. The TOSA 220 is accommodated in the encapsulation casing 210, and the TOSA 220 may include a light emitting element 221 and a thin film lithium niobate (LiNbOx, preferably LiNbO$_3$) modulator 222.

The light emitting element 221 may be, but not limited to, a laser generator, and the bandwidth and the wavelength of the laser generator are not limited. For example, the laser generator for the bi-directional and multi-channel optical module 20 may be a continuous wave laser (CW laser). The thin film LiNbOx modulator 222 may include a light receiving end 2221 and at least one light propagation end 2222 which are located at the same side thereof. The light receiving end 2221 may be optically coupled with the light emitting element 221. The thin film LiNbOx modulator 222 may include a plurality of light propagation ends 2222 optically coupled with the fiber access terminals 211 on the encapsulation casing 210, respectively. The fiber access terminals 211 and the light emitting element 221 are located at the same side of the thin film LiNbOx modulator 222. A ferrule 4 and a ceramic sleeve 5 may be disposed at each fiber access terminal 211 to thereby allow the insertion of an optical fiber.

TOSA 220 may further include a thermoelectric cooler accommodated in the encapsulation casing 210. The thin film LiNbOx modulator 222 may be in thermal contact with the thermoelectric cooler for heat dissipation. Furthermore, the TOSA 220 may further include at least one coupling lens and at least one optical isolator accommodated in the encapsulation casing 210. The coupling lens and the optical isolator may be disposed between the light emitting element 221 and the light receiving end 2221 of the thin film LiNbOx modulator 222.

The ROSAs 230 may be accommodated in the encapsulation casing 210, and each of the ROSAs 230 may include a light receiving element 231 and a coupling lens 232. The light receiving element 231 may be, but not limited to, a photodiode configured to receive external optical signals propagating into the encapsulation casing 210. In this embodiment, each of the ROSAs 230 may further include a transimpedance amplifier (TIA) 230 configured to convert electric current to voltage signals. Each ROSA 230 is optically coupled with respective fiber access terminal 211 for receiving the external optical signals.

The light emitting element 221 can emit an optical signal with a wavelength of 1270 nm, and the light receiving element 231 can receive and be in response to another optical signal with a wavelength of 1330 nm. The aforementioned wavelengths of the optical signal are simply exemplary description and the present disclosure is not limited thereto. In some other embodiments, the light emitting element and/or the light receiving element can emit and/or receive optical signals having suitable wavelength for long distance transmission applications. The wavelength of the optical signals mentioned herein may refer to a peak in a spectral linewidth, and said optical signals in different wavelengths may refer to at least two different peaks.

The optical folding elements 240 may be accommodated in the encapsulation casing 210, and the number of ROSAs 230 may be the same as the number of the optical folding elements 240. The optical folding elements 240 may be optically coupled with the light propagation ends 2222 of the thin film LiNbOx modulator 222, respectively. Each of the optical folding elements 240 may be configured to change a traveling direction of the light emitted by the TOSA 220. As shown in FIG. 4, each optical folding element 240 may correspond to one of the ROSAs 230, allowing for one ROSA 230 to share one of the fiber access terminals 211 with the TOSA 220.

Each of the optical folding elements 240 may include a right-angle prism 241 and an oblique prism 242. The right-angle prism 241 may be disposed corresponding to the light receiving element 231, and the right-angle prism 241 may include a light passing surface 2411 substantially orthogonal to an optical path of the ROSA 230, and an optical surface 2412 inclined with respect to the optical path of the ROSA 230. The light passing surface 2411 and the optical surface 2412 of the right-angle prism 241 might allow for the external optical signals, within an exemplary wavelength of 1330 nm and propagating toward the light receiving element 231, to pass through. In other words, the light passing surface 2411 and the optical surface 2412 might be associated with the high transmittance for the external optical signals, such that the external optical signals entering into the encapsulation casing 210 via the fiber access terminal 211 can travel through the light passing surface 2411 and the optical surface 2412 to thereby reach the light receiving element 231 without the optical path of the ROSA 230 being turned.

The oblique prism 242 may be disposed corresponding to the thin film LiNbOx modulator 222, and the oblique prism 242 may include two light passing surfaces 2421 substantially orthogonal to an optical path of the TOSA 220, and two optical surfaces 2422 inclined with respect to the optical path of the TOSA 220. The optical surface 2412 of the right-angle prism 241 may be attached to one of the two optical surfaces 2422 of the oblique prism 242. The light passing surfaces 2421 of the oblique prism 242 might allow for the optical signals, within an exemplary wavelength of 1270 mm and propagating from the light propagation end 2222, to pass through, while the optical surface 2422 might reflect the optical signals within the exemplary wavelength of 1270 mm and propagating from the light propagation end 2222. The light passing surface 2421 and the optical surface 2422 of the oblique prism 242 might allow for the external optical signals, within the exemplary wavelength of 1330 nm, to pass through. In other words, the light passing surface 2421 might be associated with high transmittance for the external optical signals received by the light receiving element 231 and the optical signals which has been modulated by the thin film LiNbOx modulator 222. The optical surface 2422 might be associated with high reflectivity for the optical signals which has been modulated by the thin film LiNbOx modulator 222. The terms "high transmittance" and "high reflectivity" mentioned herein refers to the transmittance and reflectivity that meet the requirements for optical signal transmission. For example, a transmittance of at least 95% may be defined as high transmittance, and a reflectivity of at least 99% may be defined as high reflectivity, in order to achieve relevant technical effects for optical communication applications.

In this embodiment, allowing the optical signals within specific wavelength (e.g., 1270 nm or 1330 nm) to pass through each of the light passing surface 2411, the optical surface 2412 and the light passing surface 2421 might require these surfaces to be equipped with a filter film, with the filter film capable of 95% or more in transmittance for specific wavelengths. Also, an exemplary means for reflecting the optical signals within the specific wavelength (e.g., 1270 nm) at the optical surface 2422 may be realized with a filter film disposed on the optical surface 2422, where such filter film has a reflectivity of 99% or more for a specific wavelength.

In this embodiment, the fiber access terminals 211 may be with corresponding number to the ROSAs 230. Moreover, the propagation ends 2222 of the thin film LiNbOx modulator 222, the ROSAs 230, the optical folding elements 240 and the fiber access terminals 211 on the encapsulation casing 210 may be equal in number. Referring to FIG. 4, a total of two light propagation ends 2222, a total of two ROSAs 230, a total of two optical folding elements 240 and a total of two fiber access terminals 211 are provided. The light receiving end 2221 of the thin film LiNbOx modulator 222 may be located between the two light propagation ends 2222. More specifically, the two light propagation ends 2222 may be symmetrically distributed about the light receiving end 2221, and the two optical folding elements 240 may be symmetrically distributed about the light emitting element 221.

In this embodiment, the bi-directional and multi-channel optical module 20 may further includes a ceramic feedthrough 250 disposed on the encapsulation casing 210 by soldering and brazing. The ceramic feedthrough 250 may be electrically connected with the thin film LiNbOx modulator 222. The ceramic feedthrough 250 could be helpful to meet the requirements of broad bandwidth and low radio frequency loss.

Figure 5:
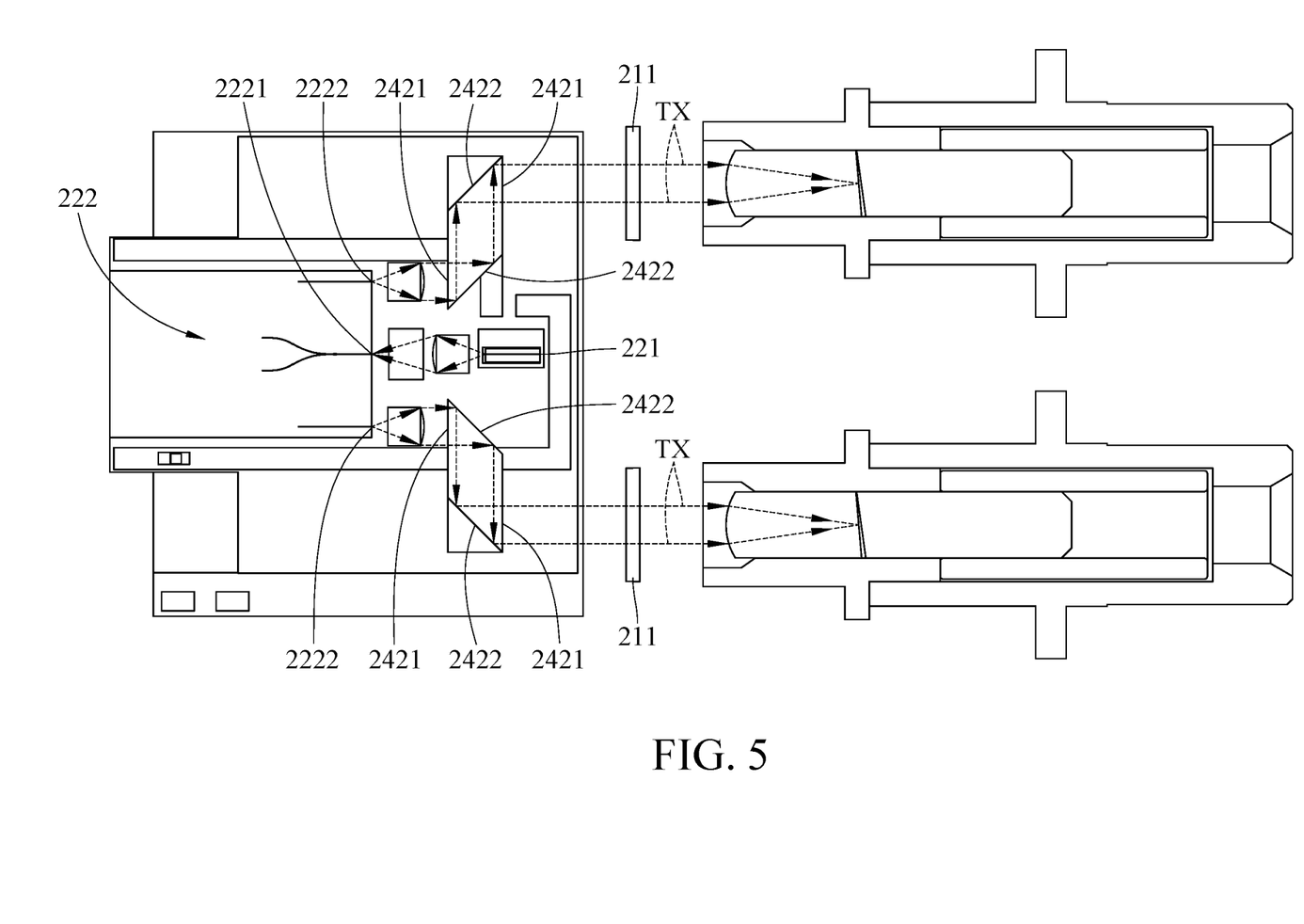
FIG. 5 is a schematic view showing an optical path of the TOSA of the bi-directional and multi-channel optical module in FIG. 4.

The bi-directional optics using single TOSA could still enable the single TOSA 220 to share one of the fiber access terminals 211 with one of the ROSAs 230. FIG. 5 is a schematic view showing an optical path of the TOSA of the bi-directional and multi-channel optical module in FIG. 4. A single channel optical signal emitted by the light emitting element 221 is coupled into the thin film LiNbOx modulator 222. The optical signal is modulated by the thin film LiNbOx modulator 222 before the corresponding modulated optical signals might propagate from the light propagation ends 2222 of the thin film LiNbOx modulator 222. The modulated optical signal that is propagated from one of the light propagation end 2222 and within the exemplary wavelength of 1270 nm could be allowed to pass through the light passing surface 2421, the optical surface 2422, the other optical surface 2422 and the other light passing surface 2421. The optical path TX of the TOSA 220 can be folded for the first time by one of the optical surfaces 2422 and then folded for the second time by the other optical surfaces 2422. In short, the optical path TX might be folded two times, such that the optical signals generated by the TOSA 220 can travel through the optical folding element 240 to reach the optical fiber at the outside of the fiber access terminal 211.

Figure 6:
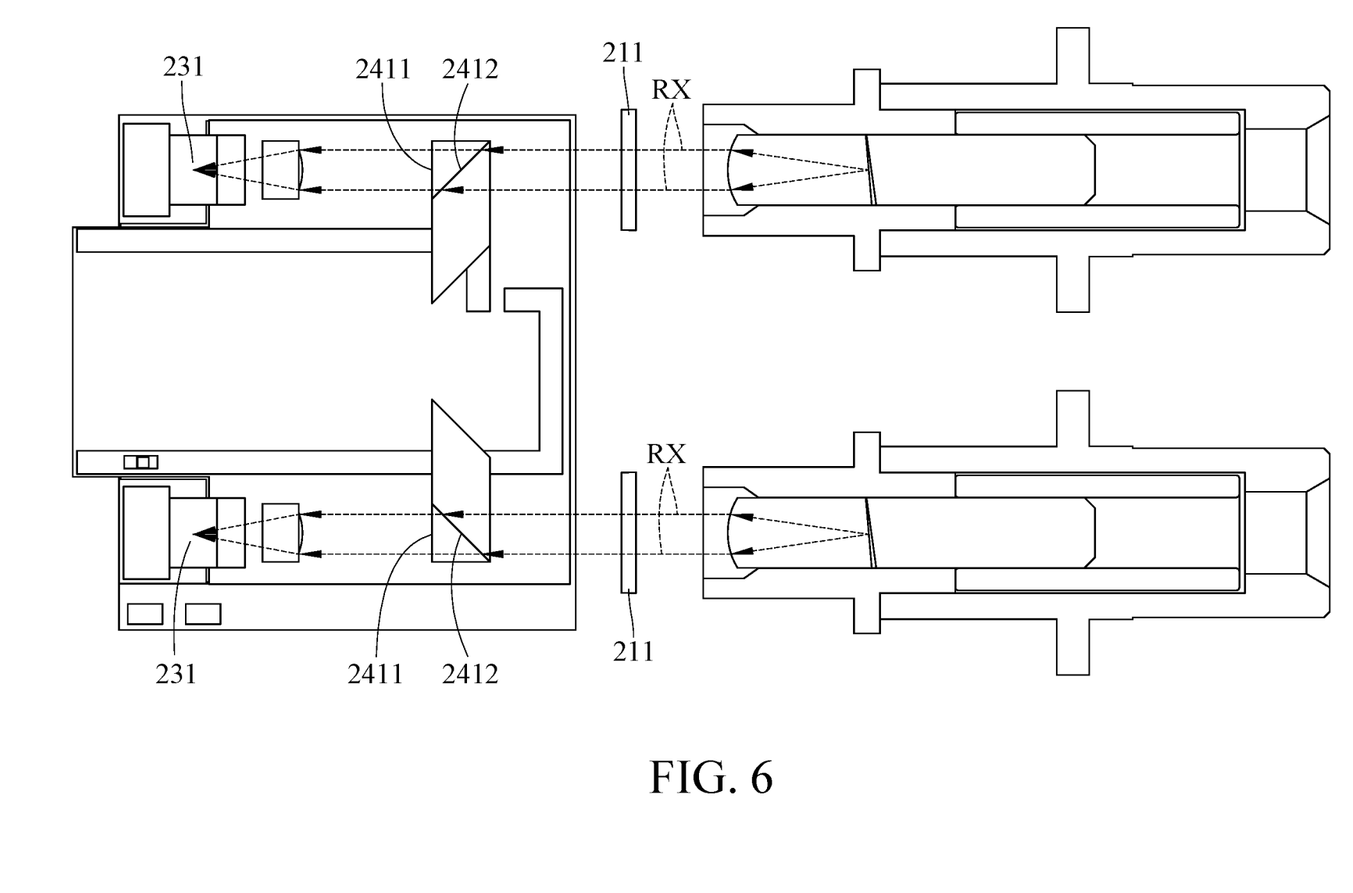
FIG. 6 is a schematic view showing an optical path of the ROSA of the bi-directional and multi-channel optical module in FIG. 4.

FIG. 6 is a schematic view showing an optical path of the ROSA of the bi-directional and multi-channel optical module in FIG. 4. The external optical signals within the exemplary wavelength of 1330 nm may enter into the encapsulation casing 210 through the fiber access terminals 211. The external optical signals traveling through one of the fiber access terminals 211 might sequentially travel through the optical surface 2412 and the light passing surface 2411 so as to be eventually received by the light receiving element 231. A traveling direction of the light from the fiber access terminal 211 toward the corresponding ROSA 230 (that is, an optical path RX of the ROSA 230) is parallel to a traveling direction of the light from the light emitting element 221 toward the thin film LiNbOx modulator 222 (that is, a segment of the optical path TX where the optical signal propagates from the light emitting element 221 to the thin film LiNbOx modulator 222 in FIG. 5).

According to the present disclosure, the bi-directional and multi-channel optical module includes the thin film LiNbOx modulator, and the thin film LiNbOx modulator can modulate optical signals, such that the wavelength and the bandwidth of the modulated optical signal can meet the requirements of long distance optical communication. Thus, the laser generator for the bidirectional optical module can be implemented in terms of ones with lower cost and less energy consumption compared to the conventional EML. For example, the laser generator for the optical module may be a continuous wave laser (CW laser). In addition, the optical signal modulated by the thin film LiNbOx modulator could minimize the occurrence of poor transmission quality in the optical module for long distance and high speed optical communication applications.

Moreover, according to the present disclosure, an integration of at least two ROSAs and one TOSA in single encapsulation casing is disclosed. Therefore, the transmission of multi-channel optical signals can be achieved by using only one light emitting element, which is helpful to reduce manufacturing costs and improve the dimensions of the optical module. Compared with the setup of multiple single channel optical modules, accommodating multiple ROSAs and one TOSA in the single encapsulation casing is helpful to facility integration and further reduces the dimensions of the optical module. Further, the two light propagation ends of the thin film LiNbOx modulator can be symmetrically distributed about the light receiving end thereof, which is helpful to allow a proper distribution of the channel for transmitter and that for receivers, and thus the optical module is applicable to a wide range of communication applications.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. A bi-directional and multi-channel optical module, comprising:
   an encapsulation casing;
   a transmitter optical subassembly (TOSA) accommodated in the encapsulation casing, wherein the TOSA comprises a light emitting element and a thin film lithium niobate (LiNbOx) modulator, and a light receiving end of the thin film LiNbOx modulator is optically coupled with the light emitting element;
   a plurality of receiver optical subassemblies (ROSAs) accommodated in the encapsulation casing, wherein the ROSAs are configured to receive external optical signals propagating into the encapsulation casing; and
   a plurality of optical folding elements optically coupled with a plurality of light propagation ends of the thin film LiNbOx modulator, respectively, for changing a traveling direction of light emitted by the TOSA, and each of the optical folding elements allows for one of the ROSAs to share a fiber access terminal with the TOSA.

2. The bi-directional and multi-channel optical module according to claim 1, wherein the encapsulation casing is a one-piece formed airtight casing.

3. The bi-directional and multi-channel optical module according to claim 1, wherein a number of the light propagation ends of the thin film LiNbOx modulator is two, the light receiving end and the two light propagation ends are located at same side of the thin film LiNbOx modulator, and the light receiving end is between the two light propagation ends.

4. The bi-directional and multi-channel optical module according to claim 3, wherein the two light propagation ends are symmetrically distributed about the light receiving end.

5. The bi-directional and multi-channel optical module according to claim 1, wherein a number of the optical folding elements is two, and the two optical folding elements are symmetrically arranged about the light emitting element.

6. The bi-directional and multi-channel optical module according to claim 1, wherein the encapsulation casing comprises a plurality of fiber access terminals with corresponding number to the ROSAs, and the ROSAs are optically coupled with the fiber access terminals, respectively, to receiver the external optical signals.

7. The bi-directional and multi-channel optical module according to claim 6, wherein a traveling direction of light from each of the fiber access terminals toward the corresponding ROSA is parallel to the traveling direction of light from the light emitting element toward the thin film LiNbOx modulator.

8. The bi-directional and multi-channel optical module according to claim 1, wherein each of the optical folding elements comprises an oblique prism having two first light passing surfaces and two first optical surfaces, the two first light passing surfaces are parallel to each other, the two first optical surfaces are inclined with respect to the two first light passing surfaces, light propagated from the light propagation ends of the thin film LiNbOx modulator is within a first wavelength, the two first light passing surfaces of the oblique prism allow for the light within the first wavelength to pass through, and the two first optical surfaces of the oblique prism reflect the light within the first wavelength.

9. The bi-directional and multi-channel optical module according to claim 8, wherein each of the optical folding elements further comprises a right-angle prism having a second optical surface and a second light passing surface, the second optical surface is attached to one of the two first optical surfaces of the oblique prism, the second optical surface is inclined with respect to the second light passing surface, the second light passing surface and the second optical surface of the right-angle prism allows the external optical signals within a second wavelength to pass through.

10. The bi-directional and multi-channel optical module according to claim 1, further comprising a ceramic feedthrough disposed on the encapsulation casing.

11. The bi-directional and multi-channel optical module according to claim 1, wherein the light receiving end is between two of the light propagation ends.

12. A bi-directional and multi-channel optical module, comprising:
a TOSA comprising a light emitting element and a LiNbOx modulator, and a light receiving end of the thin film LiNbOx modulator is optically coupled with the light emitting element;
a plurality of ROSAs; and
a plurality of optical folding elements optically coupled with a plurality of light propagation ends of the thin film LiNbOx modulator, respectively, for changing a traveling direction of light emitted by the TOSA; and
a plurality of fiber access terminals optically coupled with the ROSAs, respectively;
wherein one of the optical folding elements allows for one of the ROSAs to share one of the fiber access terminals with the TOSA, and
another of the optical folding elements allows for another of the ROSAs to share another of the fiber access terminals with the TOSA.

13. The bi-directional and multi-channel optical module according to claim 12, wherein a traveling direction of light from each of the fiber access terminals toward the corresponding ROSA is parallel to the traveling direction of light from the light emitting element toward the thin film LiNbOx modulator.

14. The bi-directional and multi-channel optical module according to claim 12, wherein the TOSA, the ROSAs and the optical folding elements are accommodated in an encapsulation casing.

15. The bi-directional and multi-channel optical module according to claim 12, wherein a number of the light propagation ends of the thin film LiNbOx modulator is two, the light receiving end and the two light propagation ends are located at same side of the thin film LiNbOx modulator, and the light receiving end is between the two light propagation ends.

16. The bi-directional and multi-channel optical module according to claim 15, wherein the two light propagation ends are symmetrically distributed about the light receiving end.

17. The bi-directional and multi-channel optical module according to claim 12, wherein a number of the optical folding elements is two, and the two optical folding elements are symmetrically arranged about the light emitting element.

18. The bi-directional and multi-channel optical module according to claim 12, wherein each of the optical folding elements comprises an oblique prism having two first light passing surfaces and two first optical surfaces, the two first light passing surfaces are parallel to each other, the two first optical surfaces are inclined with respect to the two first light passing surfaces, light propagated from the light propagation ends of the thin film LiNbOx modulator is within a first wavelength, the two first light passing surfaces of the oblique prism allow for the light within the first wavelength to pass through, and the two first optical surfaces of the oblique prism reflect the light within the first wavelength.

19. The bi-directional and multi-channel optical module according to claim 18, wherein each of the optical folding elements further comprises a right-angle prism having a second optical surface and a second light passing surface, the second optical surface is attached to one of the two first optical surfaces of the oblique prism, the second optical surface is inclined with respect to the second light passing surface, the second light passing surface and the second optical surface of the right-angle prism allows the external optical signals within a second wavelength to pass through.

20. The bi-directional and multi-channel optical module according to claim 12, wherein the light receiving end is between two of the light propagation ends.

* * * * *